(12) United States Patent
Ryan et al.

(10) Patent No.: US 10,549,850 B1
(45) Date of Patent: Feb. 4, 2020

(54) PORTABLE MULTITHRUSTER UNMANNED AIRCRAFT

(71) Applicant: REDD, LLC, Saratoga, WY (US)

(72) Inventors: William Jason Ryan, Saratoga, WY (US); Robert William Streeter, Encampment, WY (US)

(73) Assignee: REDD, LLC, Saratoga, WY (US)

( * ) Notice: Subject to any disclaimer, the term of this patent is extended or adjusted under 35 U.S.C. 154(b) by 755 days.

(21) Appl. No.: 15/149,173

(22) Filed: May 8, 2016

(51) Int. Cl.
*B64C 27/08* (2006.01)
*B64C 39/02* (2006.01)

(52) U.S. Cl.
CPC ............ *B64C 27/08* (2013.01); *B64C 39/024* (2013.01); *B64C 2201/042* (2013.01); *B64C 2201/102* (2013.01); *B64C 2201/108* (2013.01); *B64C 2201/122* (2013.01)

(58) Field of Classification Search
CPC ........ B64C 2201/108; B64C 2201/102; B64C 2201/162; B64C 2201/203; B64C 2203/00; B64C 2211/00; B64C 11/46; B64C 27/08
See application file for complete search history.

(56) References Cited

U.S. PATENT DOCUMENTS

| | | | |
|---|---|---|---|
| 4,161,843 A | 7/1979 | Hui | |
| 7,854,410 B2 | 12/2010 | Fanucci et al. | |
| 7,959,104 B2 | 6/2011 | Kuntz | |
| 8,322,648 B2 | 12/2012 | Kroetsch et al. | |
| 8,827,200 B2 | 9/2014 | Radu | |
| 2014/0263823 A1 | 9/2014 | Wang et al. | |
| 2014/0339355 A1 | 11/2014 | Olm et al. | |
| 2016/0176520 A1* | 6/2016 | Goldstein | B64C 39/024 244/17.17 |
| 2016/0272317 A1* | 9/2016 | Cho | G08G 1/09 |
| 2018/0244363 A1* | 8/2018 | Lee | B64C 27/08 |

OTHER PUBLICATIONS

It's a water bottle . . . It's a thermos . . . No, It's Sprite Drone! May 21, 2015 via http://www.thedronefiles.net/2015/05/21/its-a-water-bottle-its-a-thermos-no-its-sprite-drone/.

* cited by examiner

*Primary Examiner* — Jessica B Wong
(74) *Attorney, Agent, or Firm* — Lee G. Meyer, Esq.; Meyer & Associates, LLC (57) ABSTRACT

A portable multithruster unmanned aircraft for search and rescue missions, including avalanche beacon position/detection, as well as military field operations such as "forward observer" deployment is disclosed. In one aspect, the aircraft includes four rotor assemblies, housed in cowlings, deployably stowed in a cylindrical airframe to present a smooth surface for portability in tight quarters, such as a backpack, duffle bag or the like. The rotor assemblies, upon activation, are deployed by mechanical or electromechanical means to operating, flight ready position, exterior the airframe through slots in the skin of the airframe or by unfolding the hinged cowlings nested within the airframe. In one aspect, four deployed rotor assemblies are quadrantally positioned about the airframe, preferably in a horizontal plane perpendicular to the vertical axis of the airframe. A payload, including a power source, is contained within the cylindrical airframe for operation, including navigation. In another aspect, three deployed rotor assemblies are equilaterally positioned about the airframe, preferably in a horizontal plane perpendicular to the vertical axis of the airframe.

20 Claims, 8 Drawing Sheets

PORTABLE MULTITHRUSTER UNMANNED AIRCRAFT

BACKGROUND OF THE INVENTION

Field

The present application relates to portable, unmanned multithruster aerial vehicles; and, more particularly to a compact, easily portable unmanned, multithruster onboard and/or remotely guided aircraft which can perform a number of maneuvers, functions and/or missions, both on and off station.

Related Art

Unmanned aircraft commonly referred to as "drones," have recently experienced an explosion in design, versatility, and application. These devices take on many shapes and sizes, from portable craft to sizable military machines, carrying substantial payloads, including ordinance. Of particular recent interest are the smaller, "thruster" or "rotor" powered, unmanned aerial vehicles which are controlled and/or operated by an entity on the ground using a low-range or medium-range remote control and/or have a pre-set flight path, programmed on-board to accomplish a specific mission or objective.

These unmanned aircraft employ a multitude of aerodynamic designs, but most utilize two or more thrusters for stability and maneuverability. The thrusters can be such as, for example, rotor assemblies, employing fans and/or propellers aligned in a horizontal plane relative to the vertical axis of the body of the vehicle to facilitate lift, maneuverability, and stability. The thrusters come in various types and sizes, but are generally broken down into fan or propeller, petrol-driven (gas) and electric-driven devices.

It has recently been suggested that these craft might be portable and equipped with a payload which would provide one or more communication links in rugged terrain for military use or civil rescue. One of the primary problems with the prior art aircraft designated for this usage is their weight and/or inability to be packaged into a small, compact unit for transport, as well as durability. Specifically, the prior art aircraft are not small enough to be carried into rugged terrain by, for example, rescue teams, skiers, hikers, forward observers and the like and/or they do not have sufficient power at altitude and/or they cannot be packaged in a configuration small enough and compact enough without damaging the rotors and/or the airframe during transport in a backpack, rucksack, duffle, or the like.

Many, so called, "collapsible" craft leave propeller/rotor assemblies exposed, making them difficult to pack or store in small spaces such as a backpack, as well as leaving the rotor assembly susceptible to damage and snagging during transport. Even those craft employing rotors situated on the body of the airframe expose the rotors to damage while being transported. These craft also lack the airborne power/stability to stay on station in adverse conditions. Some prior designs have incorporated body-mounted rotors aligned with the body of the craft, wherein the blades of the propeller(s) "fold down" or collapse in an attempt to solve this problem. However, these devices are still susceptible to snag damage, are difficult to transport, and are less stable in flight, especially when an "on station" mission is required.

Therefore, there is a need for a portable, multithruster, unmanned, multi-mission aircraft which is compact, rugged, and durable for transport in a portable container such as a backpack, duffel, rucksack or other personal carrier, but can be quickly and easily deployed from a stowed configuration in rugged terrain. This is especially important for rescue/communication missions, especially in rugged terrain, including military forward observer use, emergency search and rescue for skiers, hikers, and the like, as well as avalanche victim "search and rescue."

SUMMARY

A portable, unmanned aerial craft having an airframe containing a payload including a power source, navigation and communication equipment; and a plurality of thruster assemblies movably supported and attached thereto. The thruster assemblies contain thrusters at least partially surrounded by a thruster cowling and attached to a support beam. Each thruster assembly is able of movement from an undeployed stowed position interior of the airframe to a deployed flight ready position exterior of the airframe; and, from a deployed flight ready position exterior of the airframe to an undeployed stowed position interior of said airframe.

The thruster assemblies move from storage/transport position within the airframe into a flight ready operational position by means of, for example, articulation and/or telescoping, and/or folding. The airframe contains a modular payload, including navigation capability, as well as mission specific instrumentation, data storage, and control hardware, software and/or firmware. The thruster assemblies, which are at least partially encircled within the thruster cowling, are supported on thruster support beams and movably attach to the airframe on to allow egress and ingress of the thruster assembly from a stowed position interior the airframe to a deployed, flight ready, position exterior of the airframe and back again. The deployed thruster assemblies provide the necessary propulsion thrust, in concert, to lift, maneuver and propel the vehicle.

The thruster cowling, which can be load bearing, may be attached to and/or supported by the thruster support beam. The thruster cowling provides protection for the thruster when the thruster assembly is housed within the airframe in the undeployed configuration. Thus, when the unmanned aircraft is in the undeployed mode, such that the thruster assembly is housed within the airframe, the thruster cowling interfaces with the exterior surface of the airframe and/or an airframe cover to provide a compact unit for "snag free" transport by means of a backpack, duffel, rucksack or other personal carrier.

Upon deployment, the thruster assemblies egress from the interior of the airframe to the exterior of the airframe to affect an operational, flight ready configuration. Upon completion of the mission, the thruster assemblies return to the undeployed stowed position, interior the airframe either manually or automatically.

Upon activation, each of the thruster assemblies can be manually deployed or automatically deployed, by means of control circuitry or mechanical mechanism. In this manner, each thruster at least partially surrounded by a thruster cowling egresses the airframe on a thruster assembly support beam from its stowed position, interior the aircraft, to its operational, flight ready position exterior the aircraft. Thus, the device is deployed from a smooth cylindrical shape for stowing to a fully operational multithruster, unmanned aircraft.

In one embodiment, the skin of the airframe contains a number of slots which accept the thruster encircled by the thruster cowling, for egress or ingress, on support beams, out of and into the interior of the airframe. Once fully housed within the airframe, the thruster cowlings form a substantially smooth surface with the skin of the airframe.

In another embodiment, the thruster cowling at least partially surrounding the thruster is load bearing. The thruster cowling attached to the thruster support beam is hinged by means of a lockable hinge to the exterior of the airframe. Thruster cowlings of pairs of opposing thrusters are hinged by means of a locking hinge at their upper and lower portions, respectively, to allow these opposing thruster assemblies to fold into the airframe, one atop the other, for stowage. In accordance with this embodiment, the deployed thruster assemblies contained within the cowling are returned to their position interior the airframe by unlocking the locking hinge and folding the cowlings in a stacked configuration, one atop the other, to form a substantially smooth surface within the skin of the airframe. Removable airframe covers, which shield the upper and lower cowling, fit over the top and bottom ends of the airframe to form a sealed unit.

In another embodiment, the thrusters, at least partially surrounding by the thruster cowling are supported on thruster assembly support beams which are articulated from their stowed position to flight ready, operational position by means of pivots mounted on the airframe. The thruster assemblies may be automatically articulated from the stowed position through the opening or portals in the skin of the airframe into flight operational position by means of a tensioned torsion/compression spring which is attached to the airframe on one end and the thruster assembly support beams on the other.

In another embodiment, the thruster assembly support beam is a telescoping element having a first section attached to the airframe and a final section attached to and supporting the thruster assembly encircled by the thruster cowling such that when deployed, the telescoping support beam extends the thruster assembly surrounded by the thruster cowling through the opening or port in the skin of the airframe into flight ready, operational position.

The portable multithruster unmanned aircraft may employ four equally disposed thruster assemblies, each supported on an articulating thruster assembly support beam in a plane perpendicular the vertical axis of the aircraft. In this embodiment the unmanned aircraft provides a particularly stable platform which can be maneuvered easily and which provides stability in, for example, crosswinds and the like especially for "on station" assignments. Other embodiments can employ more or less thrusters. For example, the portable multithruster unmanned aircraft may utilize three equally disposed rotary assemblies, each supported on an articulating, or collapsing, or retracting, or telescoping thruster assembly support beam.

In operation, the portable multithruster unmanned aircraft can be multifunctional depending upon the specific mission/assignment. The modular payload containing navigation and controller functions can be operated remotely by, for example, a wireless ground controller and/or a modular payload containing a preprogrammed and/or uplinked "mission" configuration which uses internal information and/or that derived from a ground uplink to perform a mission or meet an objective.

The collapsible, telescopic, or retractable thruster support beams employed herein provide a more compact airframe configuration for transporting the craft to its launch destination. Additionally, multithruster airframes, which use thrusters deployed perpendicular to the vertical plane of the body of the aircraft, provide for flight and control stability. One advantage of employing rotors on extensions, such as thruster support beams, is to move thrusters away from the airframe, in order to provide greater airborne stability and control of the airborne platform, particularly for "on station" missions including, but not limited to, photography, communications, or the like.

Other aspects and features of the present invention will become apparent to those ordinarily skilled in the art upon reading specification in light of the drawings.

BRIEF DESCRIPTION OF THE DRAWINGS

Embodiments herein are illustrated by way of example and not limitation as set forth in the Figures of the accompanied drawings in which like reference numerals indicate similar elements and in which:

FIG. 5b is a detail of that portion as indicated in FIG. 5a.

DETAILED DESCRIPTION

System Nomenclature

The following terms and general definitions are used herein to describe various embodiments of the portable multithruster unmanned aircraft device and methods of using same.

Articulating Thruster Support Beam shall mean a Thruster Support Beam movably attached to an airframe such that the Thruster Support Beam articulates from a stowed position interior the airframe to an operational flight position exterior the airframe.

A Fan shall mean an element of a Thruster which produces a substantial amount of thrust for a given diameter by utilizing a large number of blades wherein the closeness of the blades one to another affects the airflow around each one.

Hinged Thruster Assembly shall mean a Thruster Support Beam attached to a load bearing thruster cowling wherein the load bearing thruster cowling is fastened to one leaf of a locking hinge with the other leaf of the locking hinge attached to the airframe such that as to allow egress and ingress movement of the thruster assembly from the stowed position within the airframe to an operational, flight ready position exterior the airframe and back.

Propeller shall mean a special type of thruster having a revolving shaft containing two or more blades attached thereto wherein the angle of the blades may be able to be varied to affect the pitch.

Slot shall mean an opening or aperture in the skin of the airframe adapted to accept the ingress and egress of the cowling surrounded/encircled thruster mounted on an assembly support beam.

Telescoping Thruster Assembly Support Beam shall mean a multi-segmented Thruster Support Beam attached to the airframe wherein the Thruster Support Beam "telescopes" from the stowed position interior the airframe to an operational flight position exterior the airframe by successive extensions of each telescoping segment.

Thruster shall mean a device and/or apparatus used by an aircraft to provide propulsion for locomotion, station keeping, guidance, and attitude control.

Thruster Support Beam shall mean a structural support element of a thruster assembly for attachment to and operational support of the Thruster Assembly and/or the thruster cowling.

DETAILED DESCRIPTION

Figure 1:
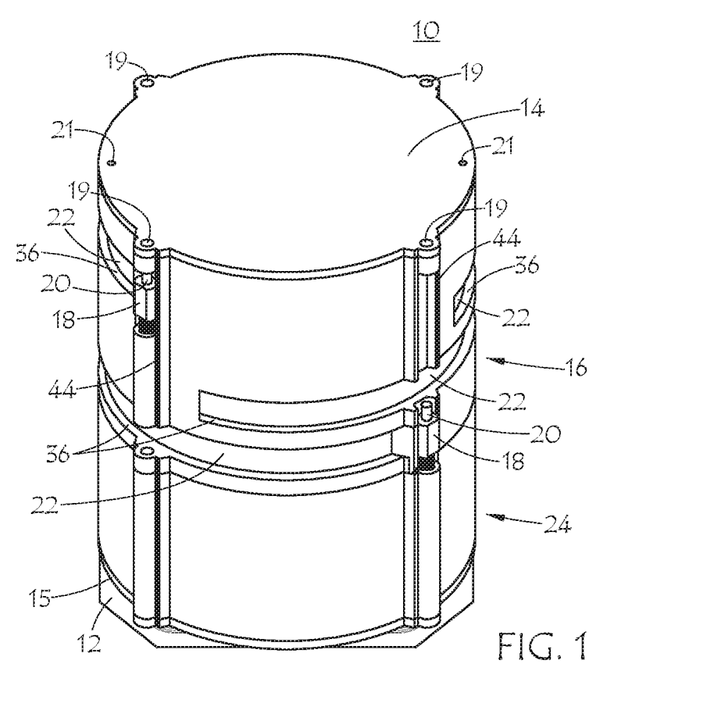
FIG. 1 is a perspective view of the multithruster unmanned aircraft in the undeployed mode in accordance with one embodiment.

In FIG. 1, there is shown a multithruster unmanned aircraft 10 having a removable release handle 12; a top cover 14 containing retaining pin slots 21, pivot pin seats 19; an airframe 16 containing a modular payload 24 which may include, for example, a power source, guidance modules, and mission hardware, software, and firmware (not shown). The airframe 16 contains a number of slots 36 for ingress and egress of the thruster assemblies providing openings through which the thruster cowlings 22 pass for deployment to the operational flight mode.

Figure 2:
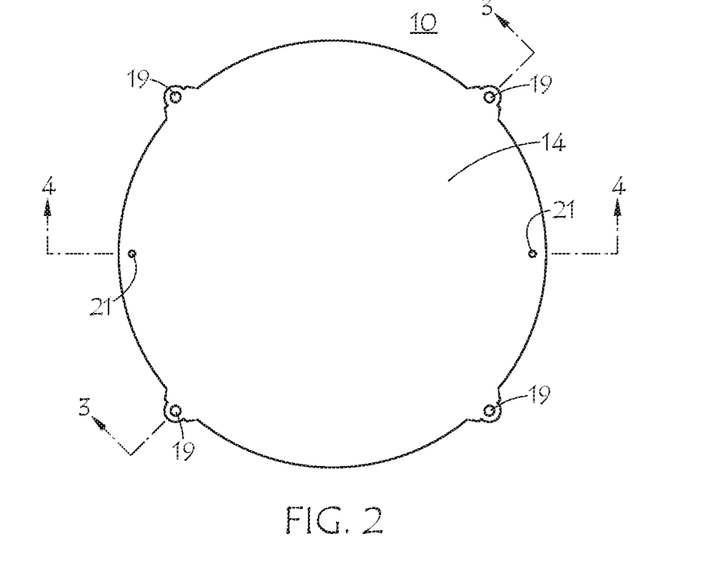
FIG. 2 is the top view of the multithruster unmanned aircraft as shown in FIG. 1.
Figure 3:
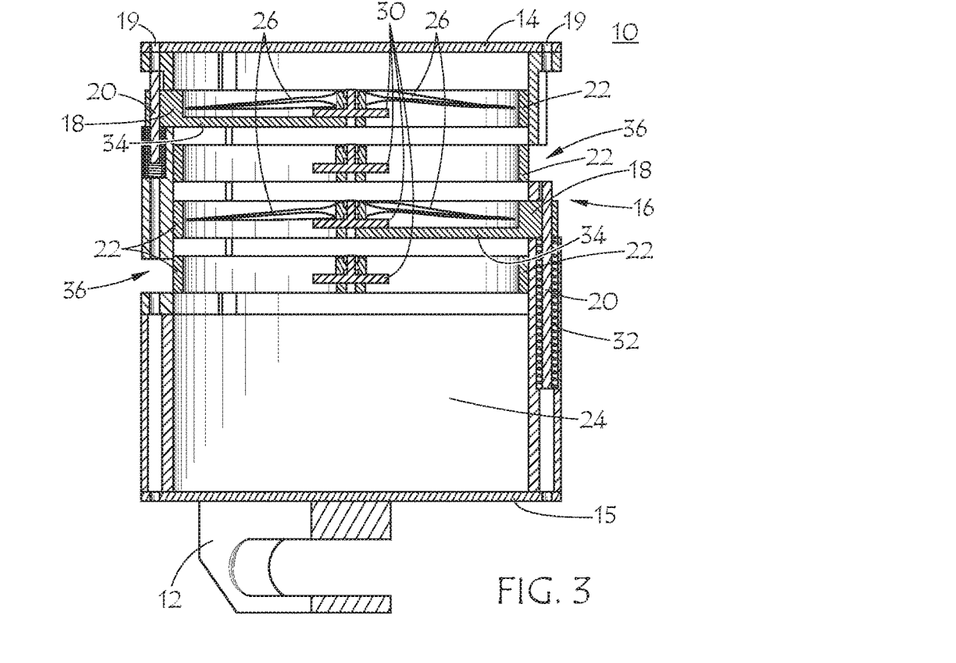
FIG. 3 is a section view of the multithruster unmanned aircraft along lines 3-3 in FIG. 2.

As seen in FIG. 2, multithruster unmanned aircraft 10 contains a top cover 14 which, in this embodiment, completely covers the top portion of airframe 16, and contains retaining pin slots 21, and pivot pin seats 19. As better seen in FIG. 3, which bisects pivot pins 20 along pivot pin seats 19, and shows an internal configuration of the multithruster unmanned aircraft 10 in its undeployed mode, each thruster assembly comprises a drive motor 30 supportingly attached to a thruster assembly support beam 34 and having a propeller 26 rotationally affixed to the driveshaft thereof at least partially surrounded by a thruster cowling 22. The thruster is surrounded/encircled by a thruster cowling 22 attached to the thruster assembly support beam 34 (see also FIG. 5). Thruster assembly support beam 34 contains a locking cam 18 having an aperture therein through which pivot pin 20 engagingly extends to become seated in pivot pin seat 19. As the thruster assembly support beam 34 articulates into operating position, locking cam 18 pivots in conjunction with pivot pin 20 as better seen in FIG. 5. Combination torsion/compression spring 32 as shown in its compressed undeployed position in FIG. 3 is connected on its one end with locking cam 18 and on its other end with airframe 16.

Figure 4:
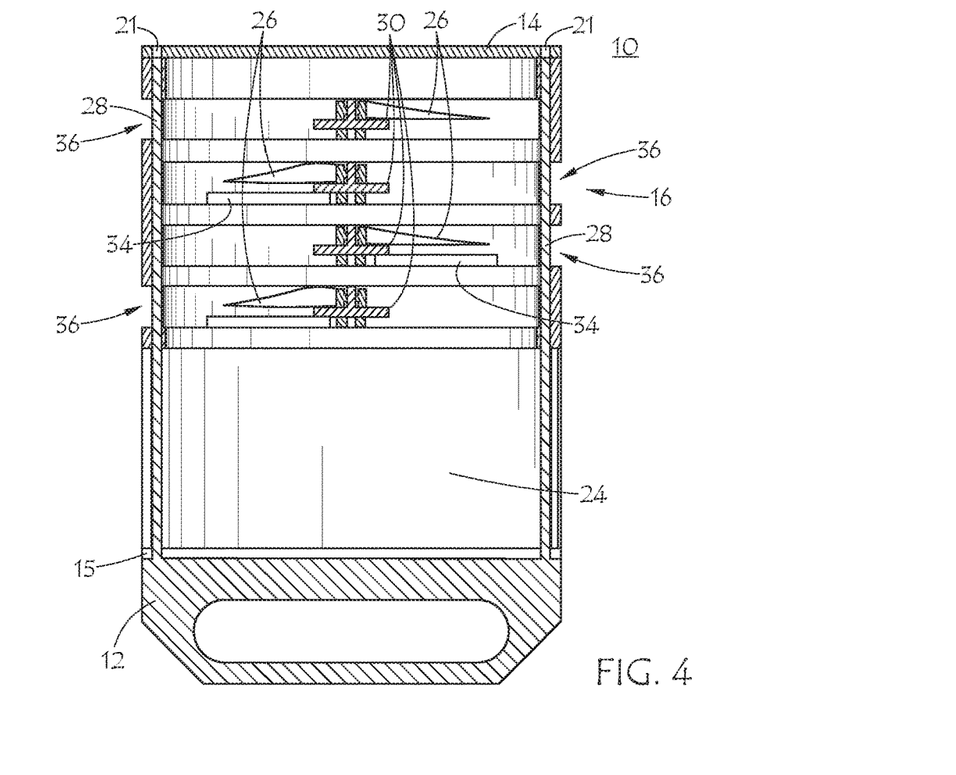
FIG. 4 is a section view of the multithruster unmanned aircraft along lines 4-4 in FIG. 2.

Turning to FIG. 4, there is shown a sectional view of FIG. 2 along line 4-4 bisecting retaining pins 28 and retaining pin slots 21. In this configuration, multithruster unmanned aircraft 10 is in its undeployed position with thruster beam assemblies stowed interior the airframe 16 to present a substantially smooth outer surface. Retaining pins 28 mounted on removable release handle 12 are shown engaging retaining pin slots 21 within thruster cowling 22 to maintain the craft in the undeployed configuration.

Figure 5:
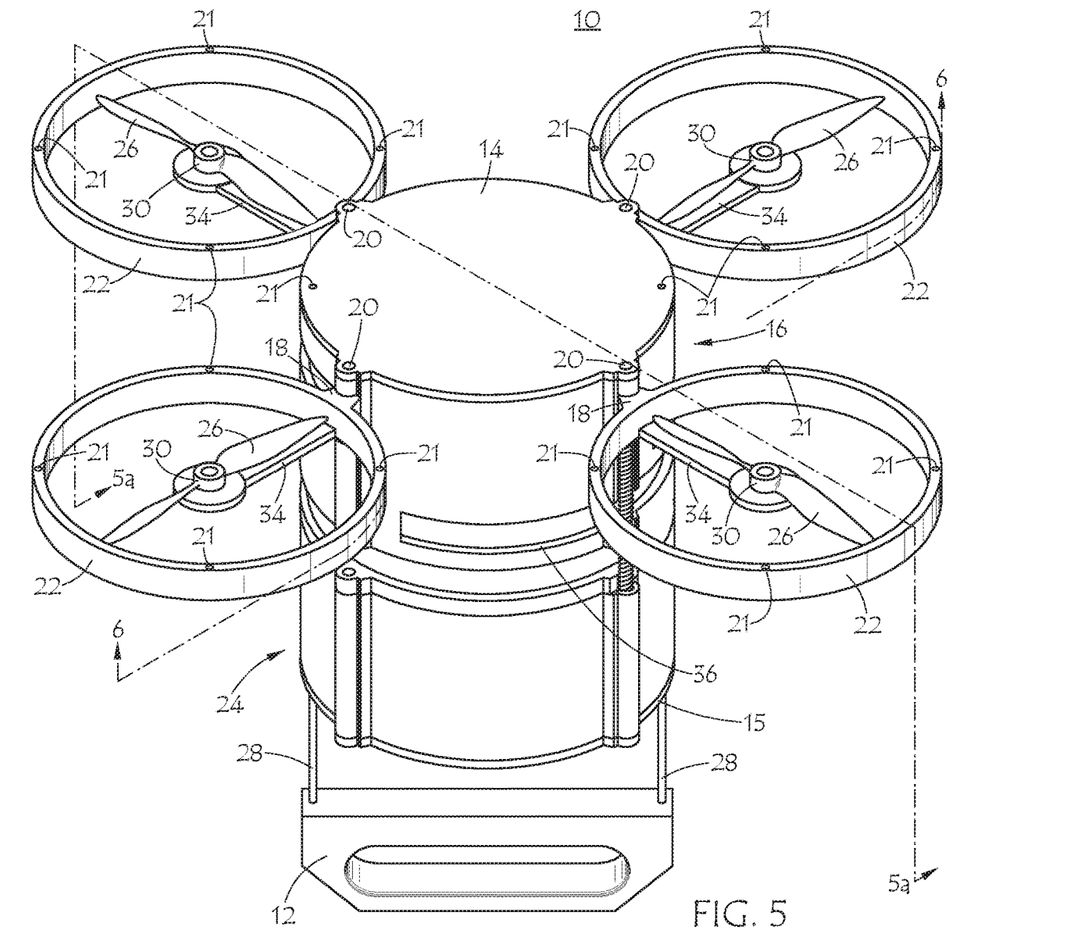
FIG. 5 is a perspective view of the multithruster unmanned aircraft of FIG. 1 in the deployed, operational mode.

FIG. 5 shows the multithruster unmanned aircraft 10 in its deployed (flight operational) mode. As can be seen in FIG. 5, once the removable release handle 12 containing retaining pins 28 is removed, the retaining pins 28 are removed from retaining pin slots 21 in thruster cowlings 22 and top cover 14, releasing the thruster cowlings and thus the thruster assemblies. As the removable release handle 12 is removed, the compressed combination torsion/compression spring 32 engaging locking cam 18 urges the unrestrained articulating thruster assembly support beams 34 through slots 36 in the skin of airframe 16 and into their deployed position exterior airframe 16.

Figure 5A:
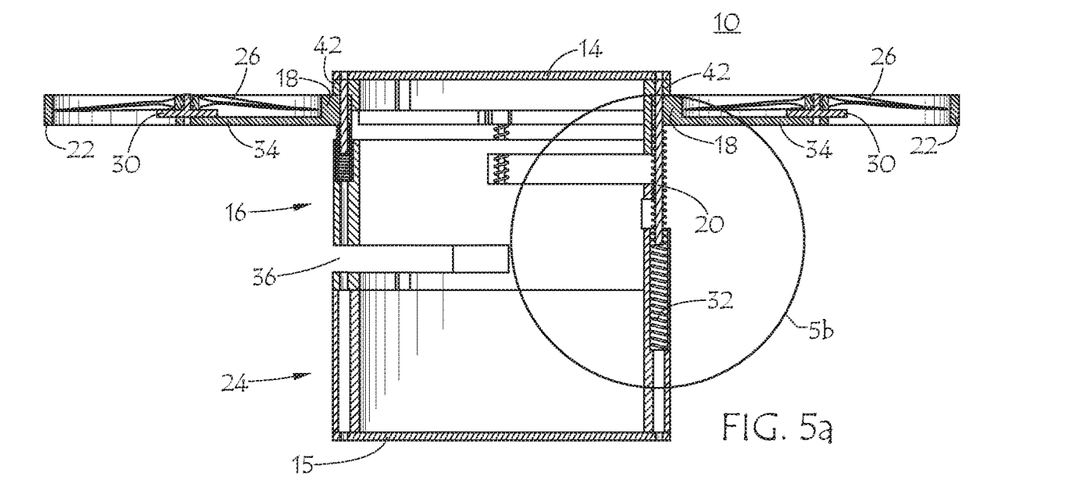
FIG. 5a is a section view of the multithruster unmanned aircraft along lines 5a-5a in FIG. 5.
Figure 5B:
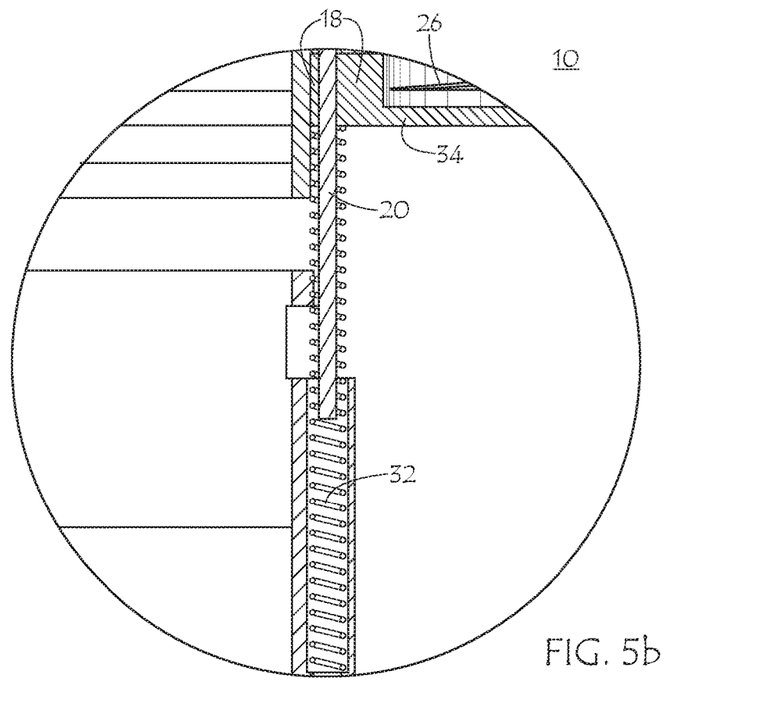
Figure 6:
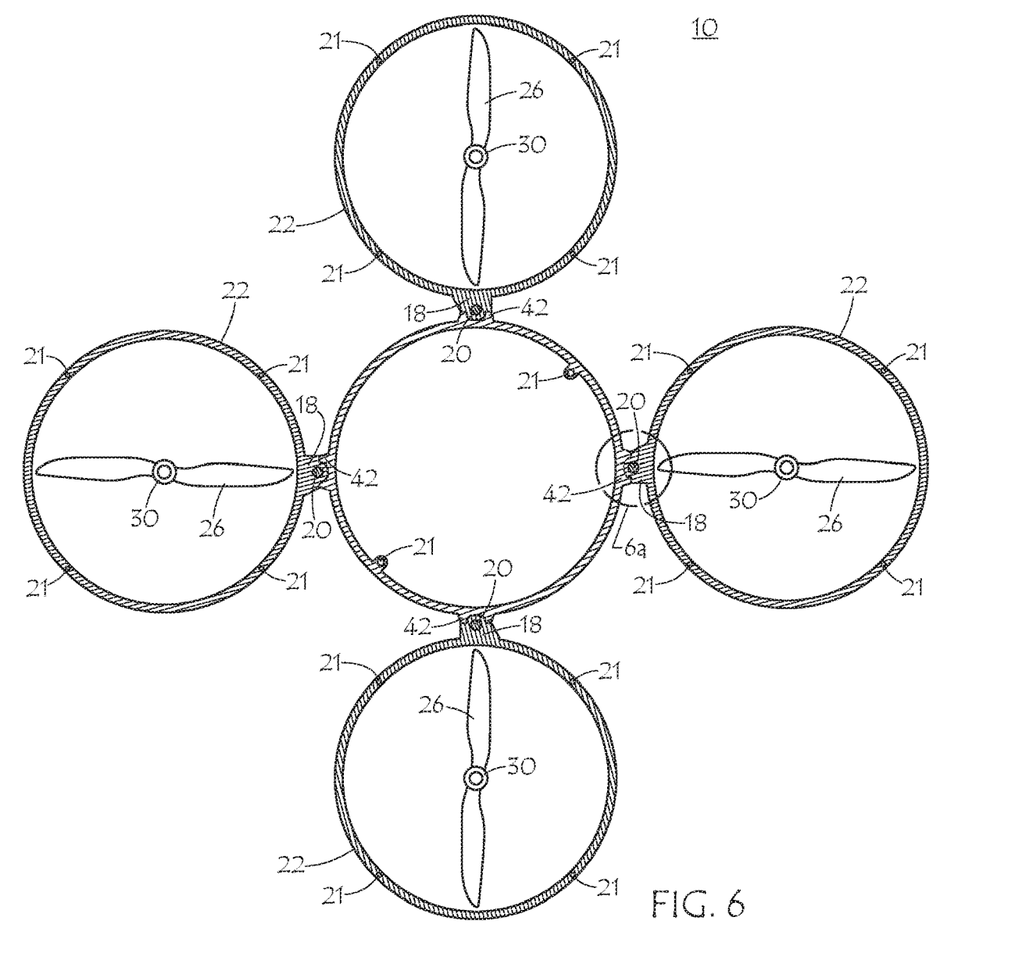
FIG. 6 is a top section view of the multithruster unmanned aircraft shown in FIG. 5 along lines 6-6.
Figure 6A:
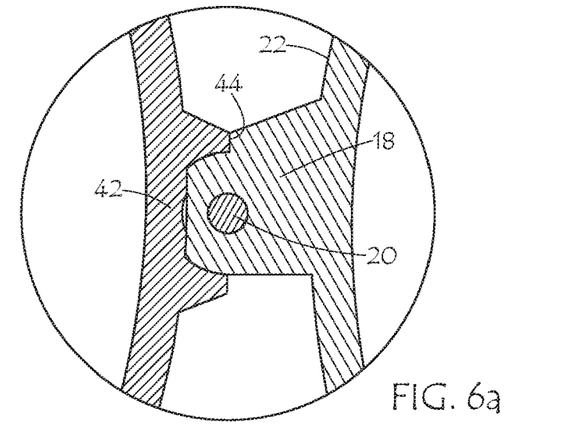
FIG. 6a is a detail of that portion as indicated in FIG. 6.
Figure 7:
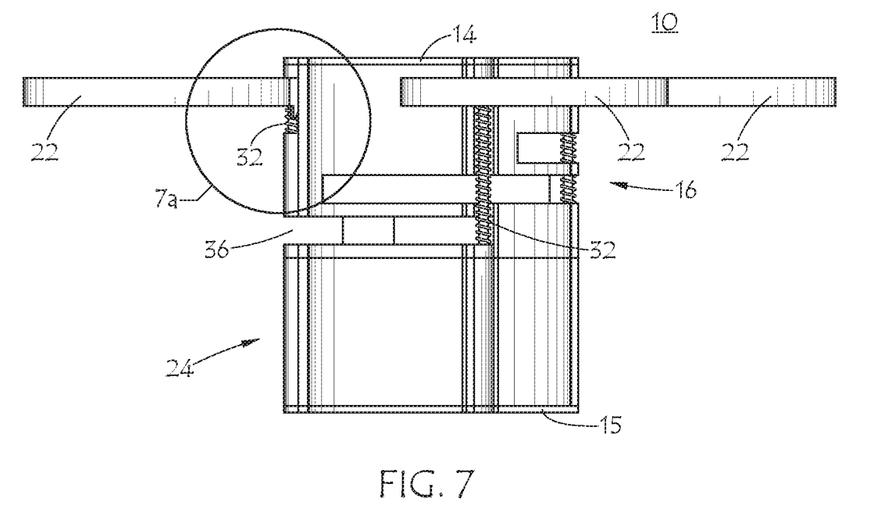
FIG. 7 is a side view of the multithruster unmanned aircraft shown in FIG. 5.
Figure 7A:
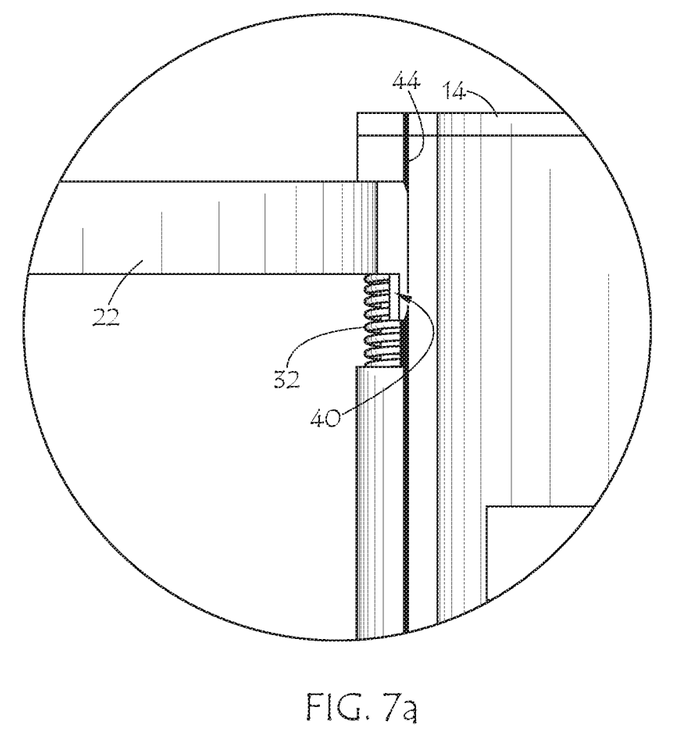
FIG. 7a is the detail of that portion as indicated in FIG. 7.

Once thruster assembly support beams 34 are articulated into this position, exterior the airframe 16, the compressed combination torsion/compression spring 32 decompresses moving thruster assembly support beams 34 by means of cam slider 40 along cam sliding surface 44 (as better seen in FIG. 7a) to urge the locking cam 18 into mating engagement with airframe cam seat 42 as shown in FIG. 6a. A detail of this arrangement is shown in FIGS. 5a and 5b. In this manner, all four thruster assemblies are positioned quadrantally about the airframe 16 in a single plane perpendicular to the vertical body axis of airframe 16.

FIG. 6 shows the multithruster unmanned aircraft 10 in its deployed (flight operational) mode with all locking cams 18 seated within their respective airframe cam seats 42 as detailed in FIG. 6a. Once thruster assembly support beams 34 are articulated and moved into locked position, as shown in FIG. 6, the multithruster unmanned aircraft 10 is fully deployed (flight operational).

It will be realized by the skilled artisan that once the removable release handle 12 is removed from the multithruster unmanned aircraft 10, retaining pins 28 no longer restrain the thruster cowlings 22 allowing the thruster assembly support beams 34 to articulate under the force created by the compressed combination torsion/compression spring 32. However, in order to be in a flight ready configuration, the multithruster unmanned aircraft 10 does not require the use of a compression spring to move the articulating thruster assembly support beams 34 by means of cam slider 40 along the sliding surface 44. Merely activating the thrusters for flight provides sufficient force to move the thruster assembly along the sliding surface 44 until locking cam 18 comes into mating engagement with airframe cam seat 42. Thus, in this embodiment, the compression portion of the combination torsion/compression spring 32 is convenient, but not necessary for the complete deployment of the portable multithruster unmanned aircraft. The torsion portion of the combination torsion/compression spring 32 can be used to articulate the thruster assembly support beams 34 as previously described, but powering up the thrusters may be used to urge the thruster assembly support beams 34 up along the side of the airframe by means of cam sliders 40 such that the locking cam 18 engages the airframe cam seat 42 to secure the thruster assembly in a horizontal plane relative to the vertical axis of the airframe for flight operation. This embodiment reduces the weight of the aircraft.

Figure 8:
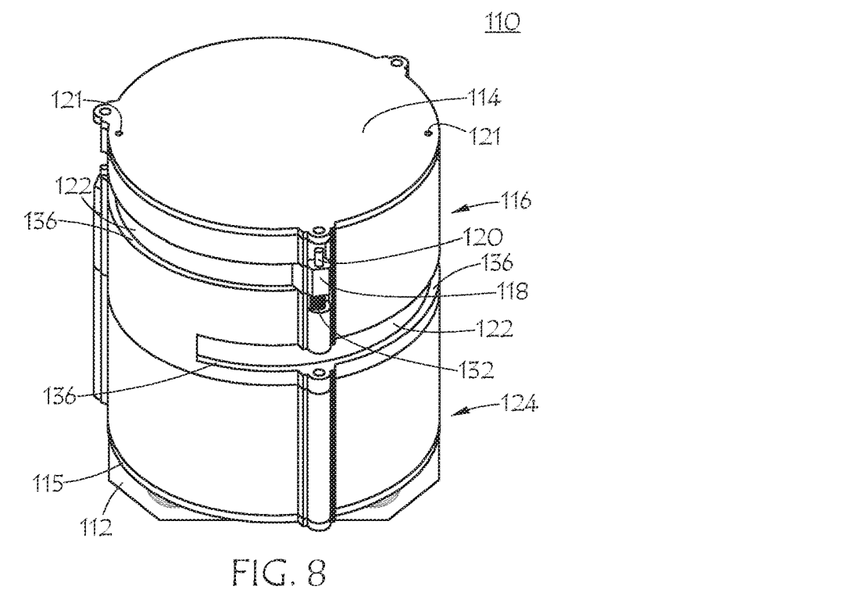
FIG. 8 is a perspective view of the multithruster unmanned aircraft in the undeployed mode in accordance with another embodiment.
Figure 9:
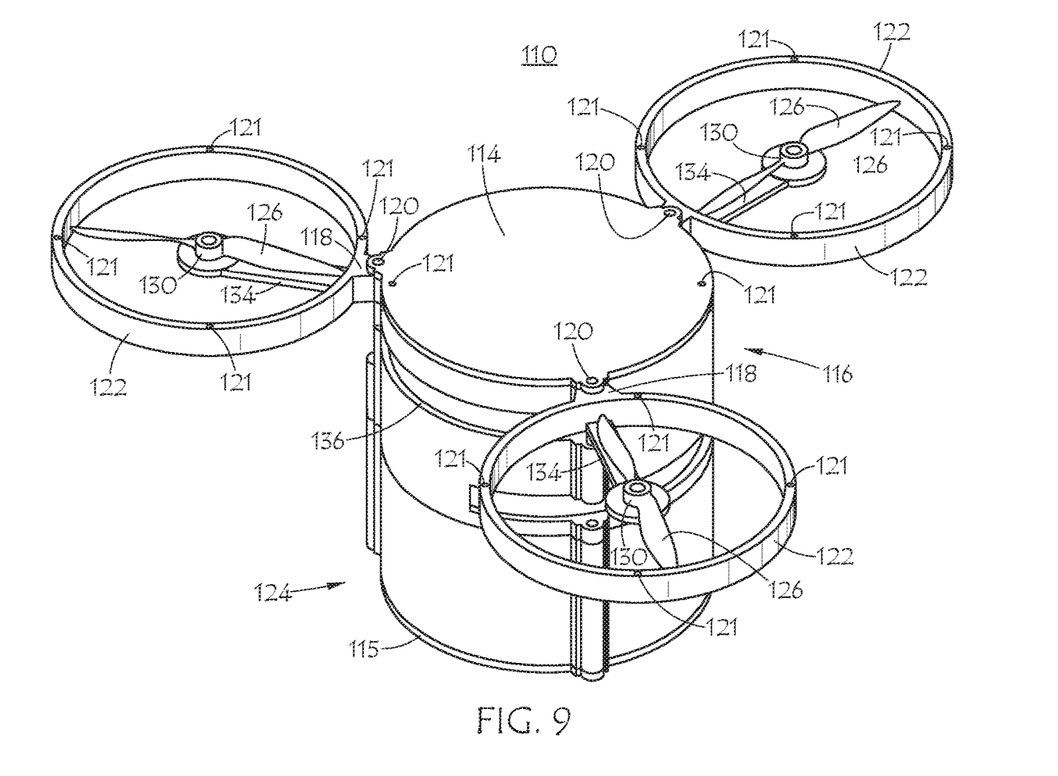
FIG. 9 is a perspective view of the multithruster unmanned aircraft shown in FIG. 8 in the deployed operational mode.

The multithruster unmanned aircraft 10, as shown in FIGS. 1-7a, employs four thruster assemblies. In accordance with another embodiment, as shown in FIGS. 8 and 9, the multithruster unmanned aircraft 110 can employ three thruster assemblies as detailed in FIG. 9. It will be realized that the deployment mechanisms required to render this embodiment flight ready can be the same as those employed in the four thruster embodiment. While it is preferred to use at least three thrusters, multiple thrusters or a combination of thrusters are equally applicable.

While the portable multithruster unmanned aircraft has been explained in detail regarding deployment using mechanical means, it will be realized that deployment may also be affected by electro-mechanical means. Thus, the portable, unmanned aircraft as set forth in the instant application can be automatically rapidly deployed in the field for flight operation by extending or articulating the thruster assembly support beams on an airframe pivot pin using mechanical or electro-mechanical means.

Moreover, it will be further realized that the thruster assembly support beams 34, as initially articulated into position, can be locked in their deployed position as they articulate from airframe 16 without necessity of further manipulation to form a horizontal plane in respect to the vertical axis of the airframe 16. This alleviates the requirement for cam sliders 40, along the side of the airframe, as well as the locking cams 18 and the cam seats 42. Although deploying the rotor assemblies into a single horizontal plane relative to the vertical axis of the airframe is preferable for operational and stability reasons, it is not necessary for the operation of the portable multithruster unmanned aircraft as described herein.

Although gas powered thrusters may be used, electric motor powered (driven) thrusters are preferred for portable use, especially for smaller units. The "fans" or "rotors" that can be utilized as thrusters can vary from simple propellers to complex multi-bladed rotors. Many such fans or rotors employ vane pitch control to provide very refined control of the craft, especially for "on station" use.

Figure 10:
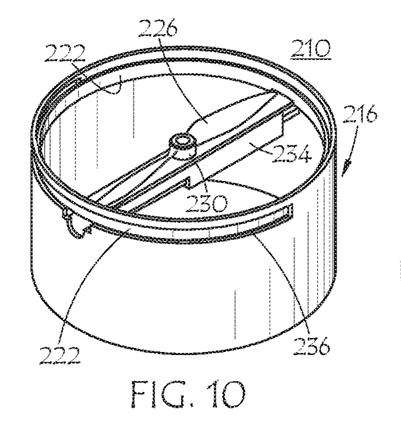
FIG. 10 is a perspective view of a portion of the multithruster unmanned aircraft in the undeployed mode in accordance with another embodiment.
Figure 11:
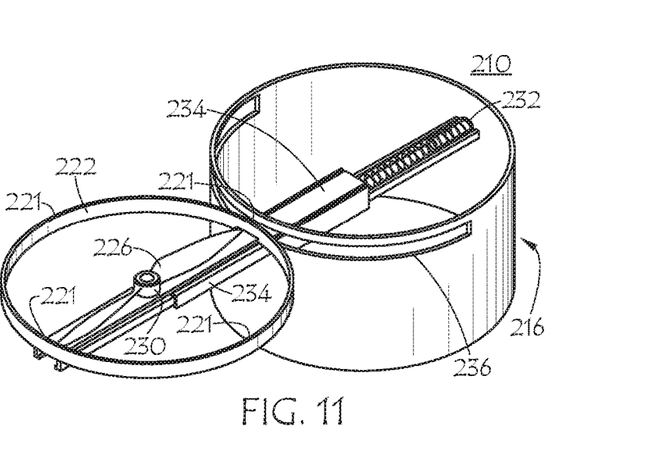
FIG. 11 is a perspective view of the multithruster unmanned aircraft portion shown in FIG. 10 in the deployed, operational mode.

In another embodiment, the thruster assembly support beams contain one or more telescoping sections which deploy by extending the telescoping portion from, for example, a central supporting strut situated central to the airframe. This embodiment is shown in FIGS. 10 and 11. Turning to FIG. 10, there is shown a truncated airframe portion 216 containing a telescoping thruster assembly support beam 234, which, as better seen in FIG. 11, is deployed by telescoping the sections thereof in a manner described as follows. Compression spring 232, having one end connected to the airframe 216 and the other to the telescoping thruster assembly support beam 234, when actuated, slides the telescoping beam portion carrying the thruster assembly into position exterior the airframe 216 through port 236. The telescoping support beam may contain a single telescoping section (as shown) or multiple sections (not shown).

One method of deployment of the configuration shown in FIG. 10 is by means of removal of a release handle (not shown) which engages the thruster cowling 222 by means of retaining pin slots 221. Once the release handle is removed, the telescoping thruster assembly support beam 234 carrying the thruster and the surrounding cowling is released to exit the airframe 216 through slots 236 by means of compression spring 232, thus being urged into operational position. This operational configuration is shown in FIG. 11.

Figure 12:
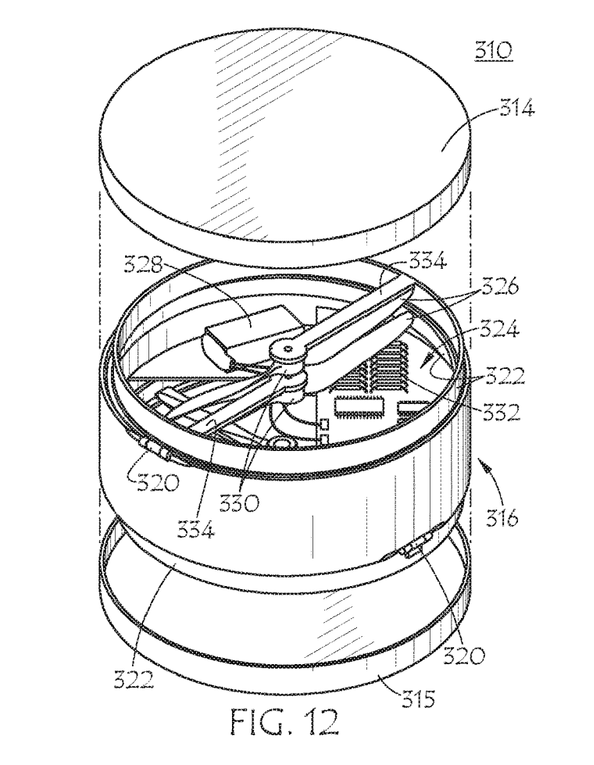
FIG. 12 is a perspective view of the multithruster unmanned aircraft in the undeployed mode in accordance with another embodiment.

In a another embodiment, as shown in FIGS. 12-15, the thruster cowlings 322 are load bearing and are hinged to the exterior of the airframe 316 in a manner to allow pairs of thruster assemblies to fold one atop the other in a stowed configuration, thus creating a substantially smooth cylindrical body for stowage/transport. Turning to FIG. 12, there is shown an undeployed (stowed) multithruster unmanned aircraft 310 having four thruster assemblies each comprising a drive motor 330 with its driveshaft rotationally attached to a propeller 326 mounted on a thruster assembly support beam 334 which in turn is attached to a load bearing thruster cowling 322. Each thruster cowling 322 is attached to the airframe 316 by means of a locking hinge 320. As can be better seen in FIGS. 14 and 15, each pair of opposing thruster assemblies is mounted to the airframe such that the hinge 320 is attached to the lower portion of the first cowling 322 and the upper portion of the second cowling 322. Each thruster cowling 322 has an outside diameter that is slightly smaller than the interior diameter of airframe 316 such that thruster cowling 322 which is hinged at its lower portion is completely nested within the airframe when in the stowed position. This arrangement allows each thruster assembly to be "stacked," one atop the other, to provide a smooth cylindrical compact configuration.

The multithruster unmanned aircraft 310 also contains a modular payload 324 which contains navigational instrumentation and controllers, as well as a mission specific instrumentation, communications equipment, and data storage as previously alluded to. For example, as shown, both the modular payload 324 and the thrusters are powered by battery 328. The top and bottom openings of the multithruster unmanned aircraft 310 are protected by top cover 314 and a bottom cover 315, respectively. The covers 314 and 315 are preferably of a "pressure friction fit" between the sidewall of the covers 314 and 315 and the interior of the airframe 316. As can be seen in FIG. 12, the covers 314 and 315 completely cover the cowling 322 of the top thruster assembly. The covers 314 and 315 can be "snapped" in place to form a completely protected uniform compact unit. It will be realized that other cover retention means, such as screw threads, may be employed to attach the covers 314 and 315 to the airframe 316.

Figure 13:
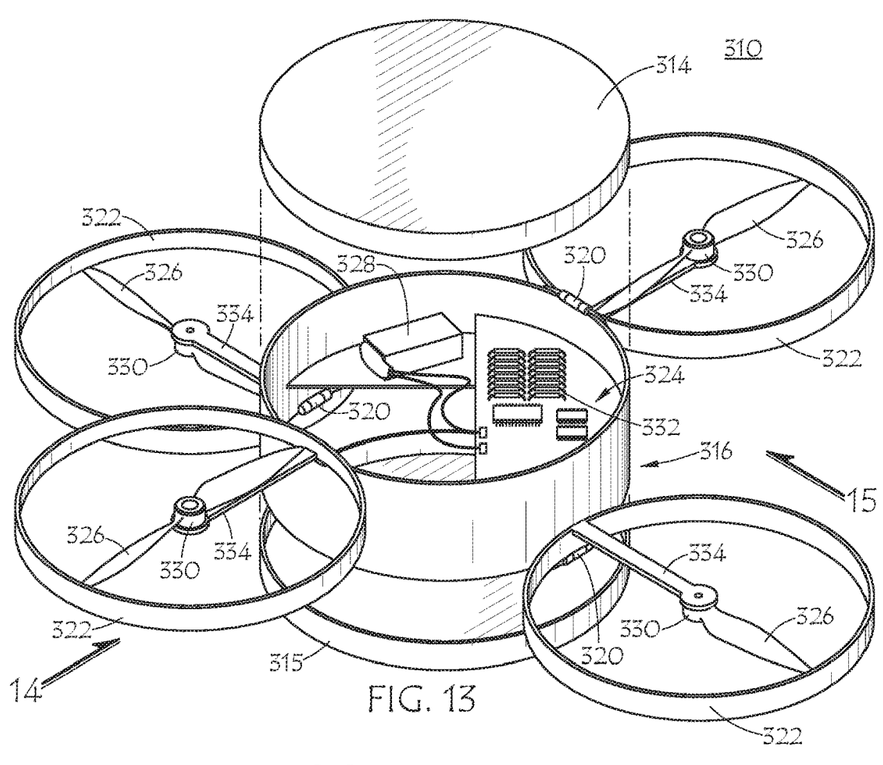
FIG. 13 is a perspective view of the multithruster unmanned aircraft shown in FIG. 12 in the deployed operational mode.
Figure 14:
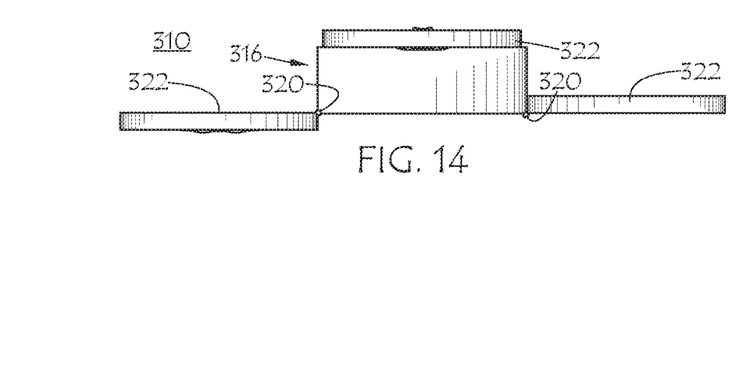
FIG. 14 is a side view of the deployed multithruster unmanned aircraft shown in FIG. 13.
Figure 15:
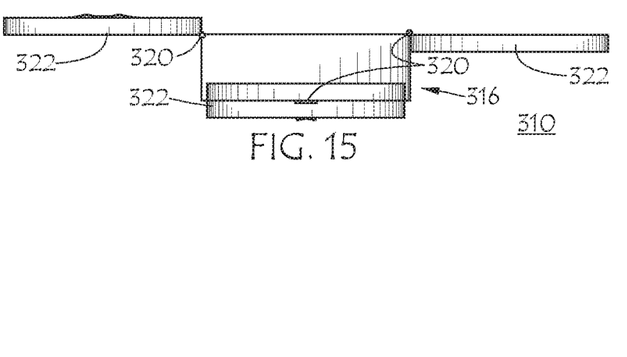
FIG. 15 is a side view of the multithruster unmanned aircraft shown in FIG. 13 at 90° from that side view shown in FIG. 14.

As better seen in FIG. 13, which shows the deployed multithruster unmanned aircraft 310 of FIG. 12, the four thruster assemblies are hinged to airframe 316 by means of locking hinges 320 with each pair of thruster cowlings 322 (one pair on the upper portion of airframe 316 and one pair on the lower portion of airframe 316) are disposed opposite one another with the pair in the upper portion being positioned 900 from the pair at the lower portion of airframe 316, as better shown in FIGS. 13 and 14. FIG. 14, a side view of FIG. 13 along arrow 14, shows the deployed configuration of this embodiment for the lower pair of thruster assemblies featuring the arrangement of the hinged thruster cowling 322, airframe 316 interface. Likewise, FIG. 15, a side view of FIG. 13 along arrow 15, shows the deployed configuration of this embodiment for the upper pair of thruster cowlings 322 featuring the arrangement of the hinged thruster cowling 322—airframe 316 interface.

In accordance with the operation of this embodiment, the undeployed device is removed from stowage; and, bottom cover 315 and the top cover 314 are removed exposing the payload, as well as the stacked thruster assemblies surrounded by the load bearing thruster cowlings 322. The thrusters are then deployed by manually unfolding the top two thrusters surrounded by the load bearing thruster cowlings 322 and likewise the bottom two thrusters, such that the locking hinges 320 are in the open position and the locking mechanisms engaged, thus allowing the thruster assemblies surrounded by the load bearing thruster cowlings 322 to maintain position during flight.

Advantageously, the thrusters for all embodiments, whether fans or propellers, may be counter-rotating to balance out the effects of torque and P-factor, also known as asymmetric blade effect. Asymmetric blade effect is an aerodynamic phenomenon experienced by a moving propeller responsible for asymmetrical relocation of the propeller's center of thrust when aircraft is at a high angle of attack (sharp banking turns). This shift in the location of the center of thrust exerts a yawing moment on the aircraft, causing it to yaw slightly to one side. A blade pitch input is required to counteract this yawing tendency.

It will be realized by the skilled artisan that by independently controlling the fans speeds or by independently changing their blade pitch, one can obtain the necessary maneuverability of the vehicle, including take off, landing, staying "on station," and/or opaque differential ground-related flying angles.

Operational Aspects

The multithruster unmanned aircraft as described herein is mission activated as follows. The operator removes the stowed multithruster unmanned aircraft from a backpack or the like and places the craft on the ground in suitable launch position and/or places the craft on a launch platform (not shown). The craft, upon activation, such as, for example, by removal of the removable release handle or manually unfolding the thruster assemblies is deployed for operation (flight mode). The multithruster unmanned aircraft upon activation acquires GPS lock either automatically or by manual or remote control. The operator initiates take off, by for example a "takeoff" button on the airframe or on a portable remote console.

In accordance with one flight mode where the multithruster unmanned aircraft carries a modular payload enabling the aircraft to create a communications link with an acquired communications ground station, the aircraft "lifts off" and attains a preprogrammed acquisition position altitude and maintains that station providing a communication link between devices used by the parties on the ground and the acquired ground station. Once the craft senses a low battery signal or is commanded by a command from the portable remote console, the craft returns to its exact launch position by means of the GPS lock. Upon completion of the mission, the craft is automatically and/or manually returned to its stowed, undeployed configuration.

In accordance with another flight mode, the modular payload contains a "GPS map" of the terrain, including communication towers, which allows the craft to maneuver around and through terrain in order to get the best signal acquisition for providing a communication link between devices used by the parties on the ground and the acquired base station. This deployment conserves craft's energy and potentially allows acquisition of the base station at lower altitudes and smaller wind shears making station keeping less energy intensive.

For search and rescue missions in avalanche debris fields where potential victims are equipped with beacons, radio repeaters or the like, the portable multithruster unmanned aircraft is carried to the avalanche site and deployed as set forth above. The payload is equipped with a "beacon locator", as well as an air ground communications link which includes GPS positioning. In this embodiment, the craft traverses the avalanche debris field to acquire a potential victim's beacon signal, GPS locks thereon, and communicates to the ground rescue crew such that the rescue crew can activate a portable ground receiver/transceiver such as a smart phone, tablet PC, PDA or the like and programmed software will visually indicate on the device both the GPS position of the avalanche rescue crew as well as that of the potential victim. As the ground rescue crew approaches the potential victim, the relative positions, as well as distances, are calculated and displayed. In this manner, line of sight between the ground rescue crew and the location of the potential victim is not required unlike prior art systems which merely "paintball mark" the suspected location of the avalanche victim.

The above description is intended to be illustrative and not restrictive. Many embodiments and many applications besides the examples provided would be apparent to those of skill in the art upon reading the above description. The scope hereof should therefore be determined, not with reference to the above description, but should instead be determined with reference to the appended claims when referring to such claims based upon the language in the instant application, as well as with the full scope of equivalents to which such claims are entitled. The disclosures of all articles and references, including patents, patent applications and publications, are incorporated by reference in their entirety and for all purposes including priority.

The invention claimed is:

1. A portable, unmanned aircraft, comprising:
 (a) an airframe containing a payload including a power source, navigation and communication equipment;
 (b) a plurality of thruster assemblies each comprising an independently driven thruster, mounted on a support beam and at least partially surrounded by a thruster cowling and said thruster assemblies movably supported on said airframe such that each of said thruster assemblies is configured for movement from a stowed position interior of said airframe through slots in the skin of the airframe to a flight ready position exterior of said airframe; and, from said flight ready position exterior of said airframe to said stowed position interior of said airframe
wherein said plurality of thruster assemblies in said stowed position, interior said airframe, are positioned in a stacked configuration, one atop the other, wherein each central vertical axis of each thruster is aligned with the central vertical axis of the airframe; and, said thruster cowlings form a substantially smooth surface with the skin of the airframe.

2. The portable, unmanned aircraft of claim 1 wherein the independently driven thrusters comprise electric motor driven thrusters and the power source is a battery.

3. The portable, unmanned aircraft of claim 1 wherein said navigation and communication equipment has the capability for acquisition and location of a beacon and the communication of such information to at least a portable ground receiver.

4. The portable, unmanned aircraft of claim 3 wherein said acquisition and location of a beacon capability includes GPS positioning.

5. The portable, unmanned aircraft of claim 1 wherein the navigation and communication equipment has the capability for acquisition and location of a communications tower and to provide a communication link from the acquired tower to at least a portable ground transceiver.

6. The portable, unmanned aircraft of claim 5 wherein said communication link capability includes GPS positioning.

7. The portable, unmanned aircraft of claim 1 wherein the thruster assemblies are movably supported on said airframe by means of a locking hinges having one leaf attached to the thruster cowling and the other to the airframe.

8. The portable, unmanned aircraft of claim 1 wherein the thruster assemblies are movably supported on said airframe by means of support beams being movably attached to the airframe and the skin of the airframe containing slots which accept the thruster assemblies, for egress or ingress, into and out of the interior of the airframe.

9. The portable, unmanned aircraft of claim 8 wherein the thruster assembly support beam is a telescoping element having a first section attached to the airframe and a final section attached to and supporting the thruster assembly.

10. The portable, unmanned aircraft of claim 8 wherein the thruster assembly support beam is articulated from their stowed position to flight ready position by pivots mounted on the airframe.

11. The portable, unmanned aircraft of claim 10 wherein the thruster assemblies are articulated from the stowed position to the flight ready position by a tensioned torsion/compression spring wherein each torsion/compression spring is attached to the airframe on one end and the thruster assembly support beams on the other.

12. A portable, unmanned aircraft, comprising:
(a) an airframe containing a payload including a power source, navigation and communication equipment,
(b) a plurality of thruster assembly support beams movably supported on said airframe,
(c) a plurality of independently driven thruster assemblies, at least partially surrounded by a thruster cowling, each thruster assembly mounted upon one of said support beams such that each of said thruster assemblies is configured for movement from a stowed position interior of said airframe to a flight ready position exterior of the airframe; and, from said flight ready position exterior of the airframe to said stowed position interior of said airframe and the skin of the airframe containing slots which accept the thruster assemblies, for egress or ingress, into and out of the interior of the airframe wherein said plurality of thruster assemblies in said stowed position interior said airframe are in positioned in a stacked configuration, one atop the other, wherein each central vertical axis of each thruster is aligned with the central vertical axis of the airframe; and, said thruster cowlings forms a substantially smooth surface with the skin of the airframe.

13. The portable, unmanned aircraft of claim 12 wherein the independently driven thrusters comprise electric motor driven thrusters and the power source is a battery.

14. The portable, unmanned aircraft of claim 12 wherein the navigation and communication equipment has the capability for acquisition and location of a beacon and the communication of such information to at least a portable ground receiver.

15. The portable, unmanned aircraft of claim 14 wherein said acquisition and location of a beacon capability includes GPS positioning.

16. The portable, unmanned aircraft of claim 12 wherein the navigation and communication equipment has the capability for acquisition and location of a communications tower and the capability to provide a communication link from the acquired tower to at least a portable ground transceiver.

17. The portable, unmanned aircraft of claim 16 wherein said communication link capability includes GPS positioning.

18. The portable, unmanned aircraft of claim 12 wherein the thruster assembly support beam is articulated from the stowed position to the flight ready; a position by means of pivots mounted on the airframe.

19. The portable, unmanned aircraft of claim 18 wherein the thruster assemblies are articulated from the stowed position to the flight ready position by a tensioned torsion/compression spring which is attached to the airframe on one end and the thruster assembly support beams on the other.

20. The portable, unmanned aircraft of claim 12 wherein the thruster assembly support beam is a telescoping element having a first section attached to the airframe and a final section attached to and supporting the thruster assembly encircled by the thruster cowling such that when deployed, the telescoping support beam extends the thruster assembly surrounded by the thruster cowling through a port in the skin of the airframe into flight ready, operational position.

* * * * *